J. J. White.
Life Preserver.
Nº 679. Patented Apr. 7, 1838.
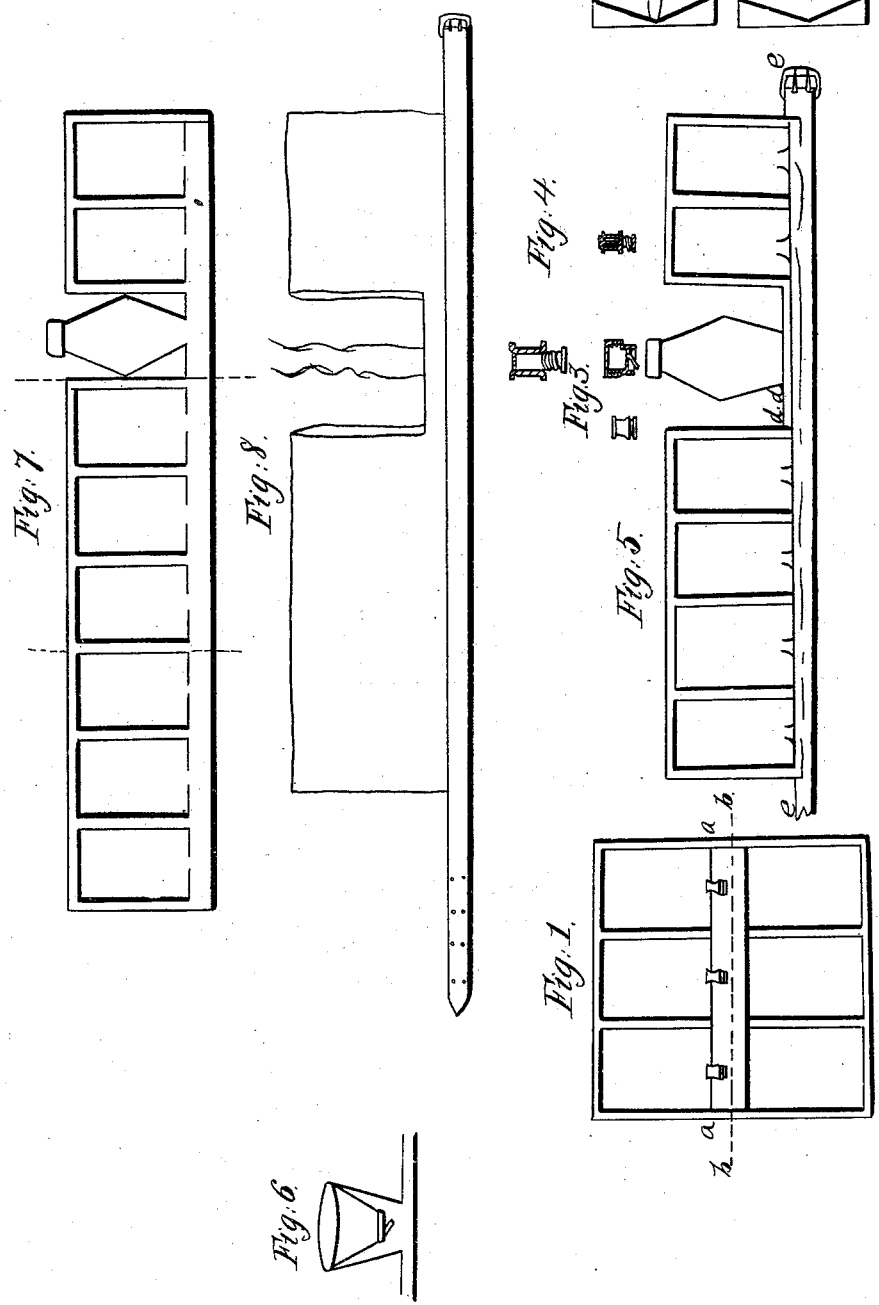

UNITED STATES PATENT OFFICE.

JNO. J. WHITE, OF PHILADELPHIA, PENNSYLVANIA.

SAFETY LIFE-PRESERVER.

Specification of Letters Patent No. 679, dated April 7, 1838.

*To all whom it may concern:*

Be it known that I, the undersigned, John J. White, of the city of Philadelphia, in the State of Pennsylvania, attorney at law, have invented a new and useful machine, called the "Self-Inflating Safety Life-Preserver," of which the following is a full and exact description.

A thin sheet of gum elastic (or any other flexible water proof material, the manner of connection hereinafter described being varied accordingly) such as may be used for ordinary life preservers is marked with the paste commonly employed to cement them and other similar manufactures in lines about one fourth to one half of an inch wide as represented in Figure 1, of the annexed drawings. Valves, described below, are placed on the line $a$, $a$, one for each chamber intended to be made; the lower half of the sheet is then turned over at the dotted line $b$, $b$, running through its center, and pressure applied by strips of wood or a frame accurately fitted on the parts thus pasted, until they firmly adhere. This process will form a series of chambers communicating with a common tube below by the valves.

A second sheet of the same material is prepared in the same manner, except that a bellows is made by cutting the part of the sheet allotted to it along the dotted line $c$, $c$, Fig. 2, down to the transverse lines. Paste being then applied to the surface darkened in the drawing, these are brought into juxtaposition in like manner, or lapped over each other, covering a light ring or oval of wire, wrapped with gum elastic, placed with the plane parallel to the common tube below as at A in the figure; the lower end thus communicating with the common tube, while into the aperture above, is fastened a box with a leathern valve opening inward:—to the top of which a cap may be added if necessary.

The valves for the chambers are cylinders of metal, represented by Fig. 3, of the said drawing concave on the surface, and reamed out at either end, through the interior passes a pin (Fig. 4,) whose head shuts the opening above, and is kept firm by a spiral spring below; a strip of thin gum elastic covered with the paste being wrapped around the cylinder, it is then laid with the head toward the chamber on the line of paste as directed above. (Fig. 1.)

The two sheets thus made up, being connected by the tube $d$, $d$, Fig. 5, made in the same way by pasting together the edges of a strip of gum elastic, and the extreme ends of the common tube hermetically sealed with the paste, a covering of linen or other suitable material (Fig. 8) is fitted to the whole while inflated, and sewed at the bottom to the strap $e$, $e$, Fig. 5.

If the machine be manufactured of gum elastic cloth, instead of pasting, the whole may be sewed together as it is directed above to paste taking care that the seams be kept air tight, which will be best effected by small stitches.

The machine, as represented in Fig. 5, is buckled around the waist, with the bellows in front. By holding with one hand the bottom and moving the top of this up and down with the other, the whole is quickly inflated, and the bellows then answers the purpose of an additional chamber, and a safe repository for bank notes, or valuable papers.

On Fig. 6, is drawn an outline of the bellows thus forced down, exhibiting the valve at the top forced below the ring, toward the bottom of the bellows.

Fig. 7, is designed to exhibit the life preserver, with the addition of a third sheet of gum elastic formed into chambers as the first sheet was directed to be. The number or the size of the chambers being varied at pleasure.

To empty the machine, the valve of the bellows is propped ajar, and each valve being successively opened, by pressing slightly the lower end of its stem, the air is thus discharged.

I claim as my invention—

The above method of forming isolated air chambers, (thus rendered entirely independent of each other by the interposition of valves,) so that loss of air in one will not affect the others, and yet capable of inflation from the same source. Also the mode of inflation by the bellows as a constituent part of the machine, whether applied to life preservers or other manufactured articles requiring inflation.

In testimony whereof I the said John J. White hereto subscribe my name in the presence of the witnesses, whose names are hereto subscribed on the twenty eighth day of March A, D, 1838.

JNO. J. WHITE.

Witnesses:
John Binns,
Henry D. Cook.